US012620374B2

(12) United States Patent
Browne

(10) Patent No.: US 12,620,374 B2
(45) Date of Patent: May 5, 2026

(54) DRUM ENHANCEMENT ASSEMBLY

(71) Applicant: Sean F Browne, Markahm (CA)

(72) Inventor: Sean F Browne, Markahm (CA)

( * ) Notice: Subject to any disclaimer, the term of this patent is extended or adjusted under 35 U.S.C. 154(b) by 229 days.

(21) Appl. No.: 18/504,774

(22) Filed: Nov. 8, 2023

(65) Prior Publication Data

US 2024/0153473 A1 May 9, 2024

Related U.S. Application Data

(60) Provisional application No. 63/423,811, filed on Nov. 9, 2022.

(51) Int. Cl.
*G10D 13/10* (2020.01)
*G10D 13/14* (2020.01)

(52) U.S. Cl.
CPC ............. *G10D 13/26* (2020.02); *G10D 13/14* (2020.02)

(58) Field of Classification Search
CPC ........ G10D 13/26; G10D 13/14; G10D 13/02; G10D 13/00
See application file for complete search history.

(56) References Cited

U.S. PATENT DOCUMENTS 10,163,426 B2 12/2018 Yoshino
11,244,661 B2 2/2022 Tanabe

FOREIGN PATENT DOCUMENTS

JP 2015075670 A 4/2015
WO PCTIB2023061296 11/2023
WO WO-2025094404 A1 * 5/2025 ............. G10D 13/10

* cited by examiner

*Primary Examiner* — Kimberly R Lockett
(74) *Attorney, Agent, or Firm* — Puget Sound Patents; Dwayne E Rogge

(57) ABSTRACT

Several examples of a drum enhancement assembly. One example including a rigid outer housing surrounding the perimeter of an electronic non-acoustic drum; with a vibration dampening collar attached to an inner surface of the rigid outer housing. Also disclosed is an example wherein the vibration dampening collar is positioned between the electronic non-acoustic drum and the rigid outer housing. To facilitate positioning of the drum enhancement assembly; surfaces defining an opening through the rigid outer housing are provided. This opening or openings are configured for passage of a drum positioning system to which the electronic non-acoustic drum is affixed.

5 Claims, 8 Drawing Sheets

DRUM ENHANCEMENT ASSEMBLY

This application is a continuation of U.S. Provisional application Ser. No. 63/423,811 filed Nov. 9, 2022, incorporated herein by reference.

BACKGROUND OF THE DISCLOSURE

Field of the Disclosure

This disclosure relates to the field of enhancements for electronic drums including a support system for said electronic drums.

BRIEF SUMMARY OF THE DISCLOSURE

Disclosed here are several examples of a drum enhancement assembly, the drum enhancement assembly including several components, and described in several examples herein. One example including a rigid outer housing surrounding the perimeter of an electronic non-acoustic drum; with a vibration dampening collar attached to an inner surface of the rigid outer housing. Also disclosed is an example wherein the vibration dampening collar is positioned between the electronic non-acoustic drum and the rigid outer housing. To facilitate positioning of the drum enhancement assembly; surfaces defining an opening through the rigid outer housing are provided. This opening or openings are configured for passage of a drum positioning system to which the electronic non-acoustic drum is affixed.

The drum enhancement assembly may optionally be arranged wherein an outer surface of the vibration dampening collar is adhered to an inner surface of the rigid outer housing.

The drum enhancement assembly may be arranged wherein an inner surface of the vibration dampening collar is in contact with an outer surface of the electronic non-acoustic drum.

The drum enhancement assembly may further include a non-acoustic drum attached to the rigid outer housing.

DETAILED DESCRIPTION OF THE DISCLOSURE

Figure 2:
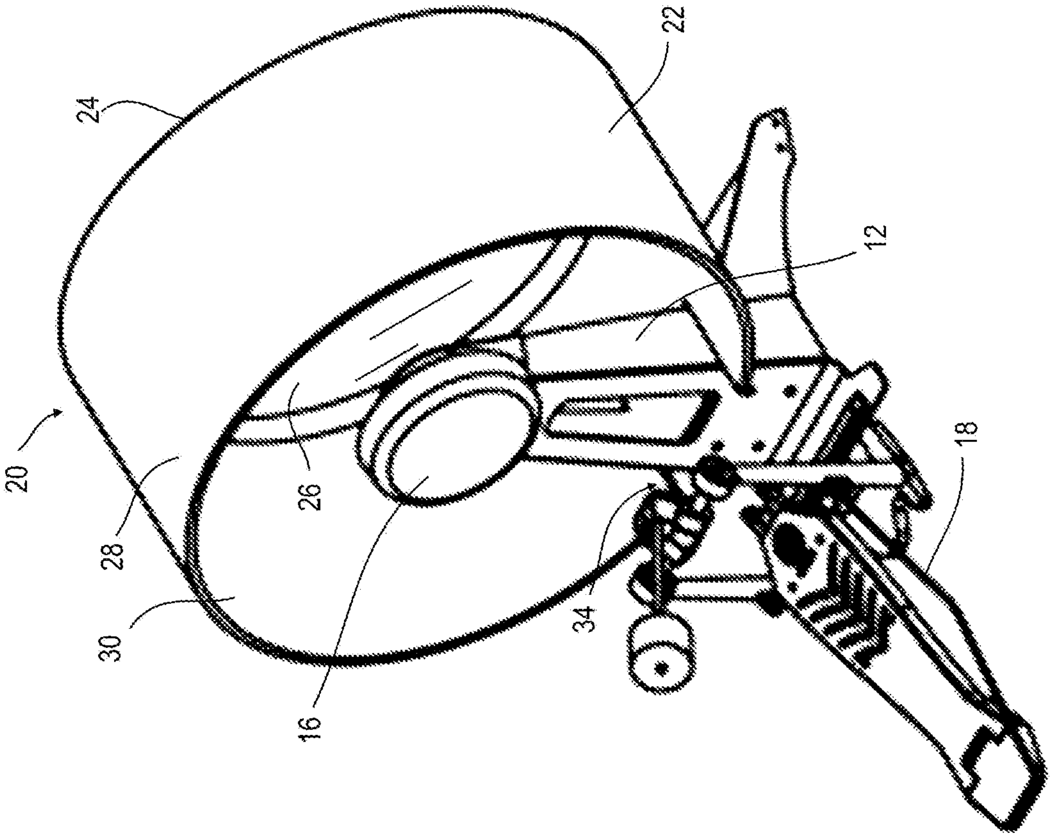
FIG. 2 is a perspective view of the example shown in FIG. 1.

Disclosed herein are several examples of drum enhancement assemblies 20, 220, 420, etc. as shown in the drawings. The labeling system used herein includes a prefix system to identify components of different examples with the same or similar functions or structure. The shell for example labeled as 22 in the first example, 222 in the second example, 422 in the third example, and so on.

In the field of electronic drums, the drums are often visually and acoustically unappealing by themselves when compared to traditional acoustic drums with acoustic drum heads. Such drums electronically transfer the vibration of the batter head or face of the electronic drum. This vibration may be recorded magnetically, acoustically, or otherwise. In traditional drums, the vibration of the batter head or face resonates acoustically. The batter head is stretched to the tone desired from the drum. Thus, in a traditional acoustic drum, the actual striking of a drumstick or beater against the batter head is not an acoustically negative sound. The striking side of the drum is known as the batter head, and the bottom head, or non-striking surface, is called the resonant head. In an electronic drum, striking the drumstick or beater against the batter head may produce a detrimental sound. Thus, acoustic dampening of the batter head and attached drum components may be desired. Disclosed herein are several examples of drum enhancement assemblies 20 formed to overcome these and other detrimental effects of electronic drums.

Several of the examples of drum enhancement assemblies 20 disclosed herein include a rigid housing or shell 22 fitted around an electronic/non-acoustic drum 16 for aesthetic appeal as well as acoustic vibration dampening from external sources. Such external vibration may negatively affect the sound produced by the drum and are therefore not desired. A dampening liner or collar 30 may also be used, positioned between the electronic drum 16 and the shell 28.

Figure 7:
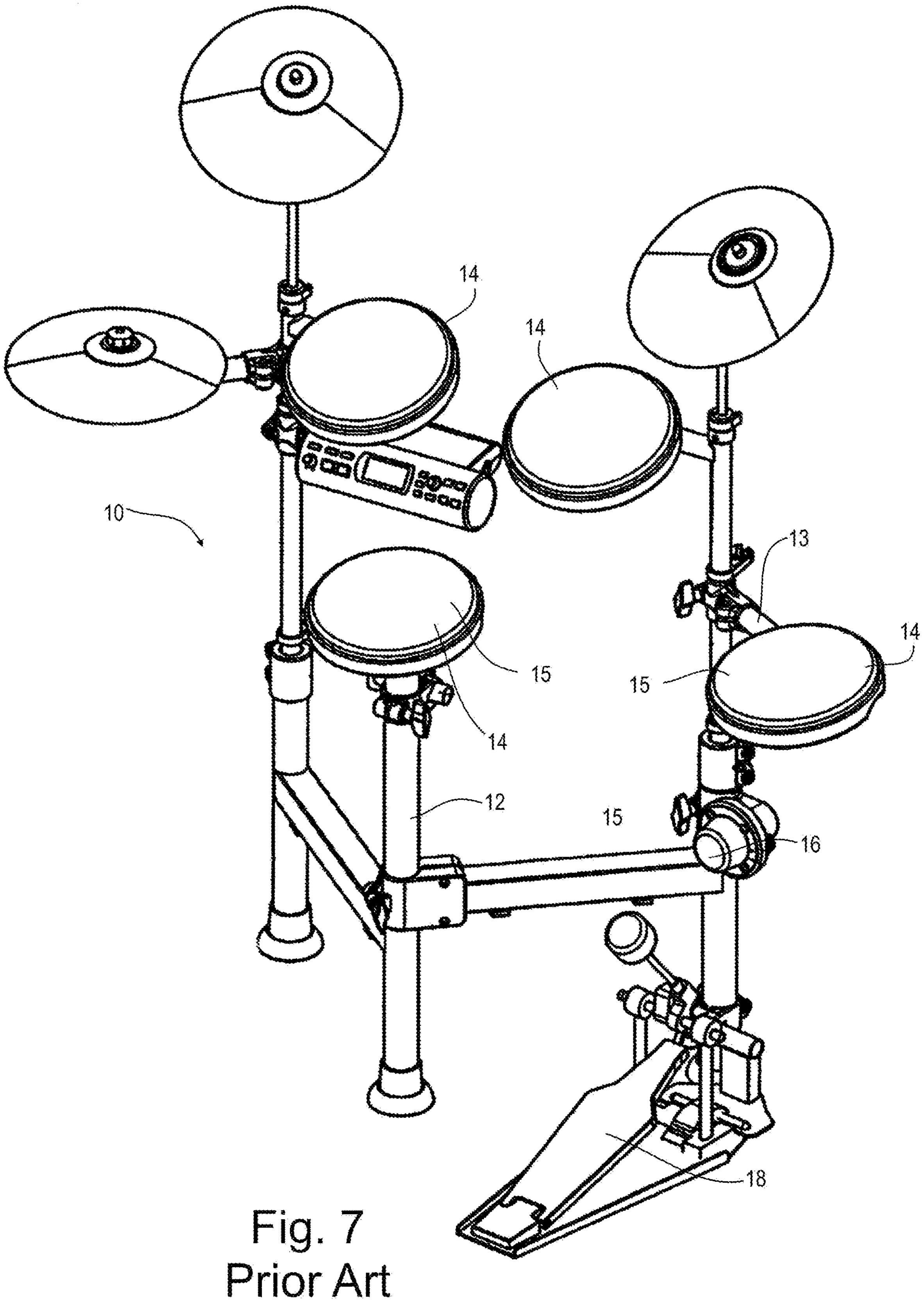
Fig. 7 Prior Art
FIG. 7 is a perspective view of a prior art electronic drum set.

Prior known electronic drum kits 10 as shown in FIG. 7 generally include a support system 12 of struts and crossbars 13 connected by clamps or other movable connectors. The support system 12 often rests on a floor or ground and supports a plurality of electronic drums 14 having electronic batter heads 15 which are struck by a user holding drumsticks or activating a beater in a manner well known in the art. Beating of the batter head 15 is recorded and transmitted as an electronic signal then saved on non-transient media or played via speakers.

Such electronic drum kits 10 often including an electronic bass drum 16 which generally rests or is mounted near the floor to be struck by operating a foot pedal 18 in a manner well known in the art. Other percussion instruments such as cymbals, cowbells, timpani, xylophone, cymbals, triangle, snare drum, tambourine, maracas, gongs, chimesas, well as other implements may also be attached to the support system 14 for stability and proper positioning during use.

These electronic non-acoustic drums 14 often comprise a striking surface or batter head 15, with sensors below the striking surface to convert the impact force or movement of drumsticks or a beater into electric signals which can be amplified, transmitted, stored, played, and modified as desired. These electric signals are then recorded and/or sent to a speaker assembly which converts the electric signals to an audible signal to be played as an audio wave. Such speaker assemblies may include devices such as loudspeakers, headset, headphones, etc.

The term “non-acoustic” adjective herein indicates that the noun to which the term is attached to is not intended to produce substantial sound in and of itself. For example, electronic non-acoustic drums 14, 16 make a minute (small) amount of sound when struck but are intended to be heard after the striking action is converted to electric signals, optionally amplified, and then converted to an audio signal at a location other than the electronic non-acoustic drums. The face of the electronic non-acoustic drums which is stuck generally does not resonate audibly as an acoustic drum batter head does.

The disclosed drum enhancement assembly in many examples deadens the slight acoustic vibration caused as the non-acoustic drum 14 is struck, before such negative vibration is heard or recorded. This vibration (sound) may not be desired to be transmitted acoustically, for example during a practice or recording session. This acoustic dampening also reduces the impact of vibrations external from the electronic drum batter head from being recorded by the drum’s sensors.

Figure 1:
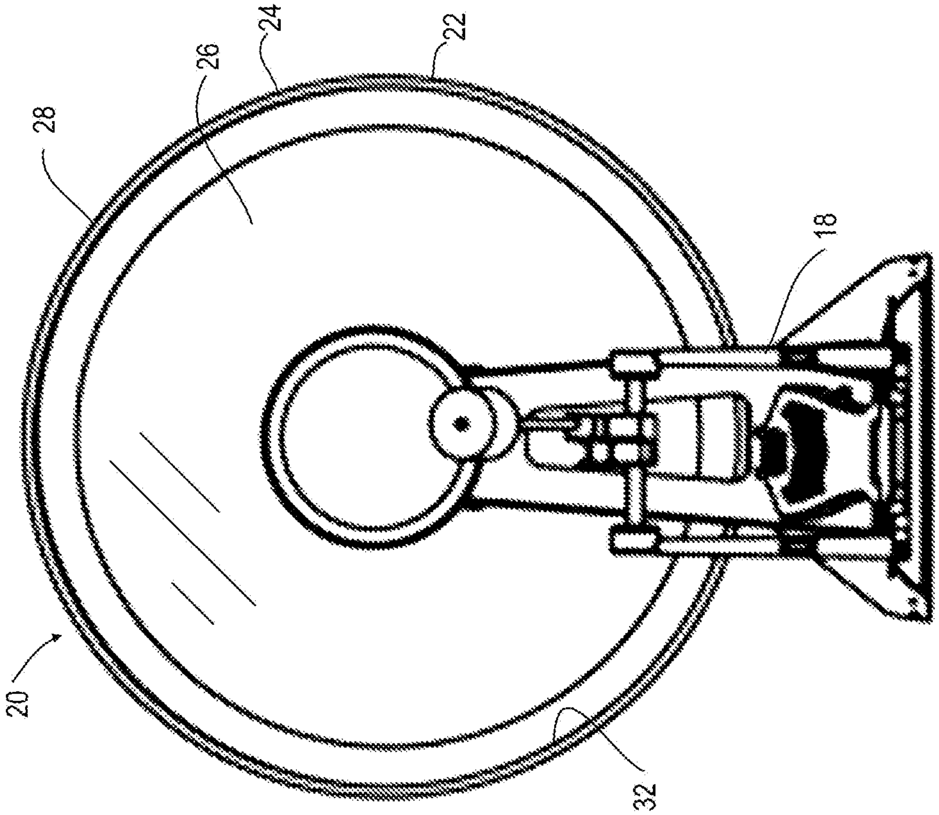
FIG. 1 is a front isometric view of one example of the disclosed drum enhancement assembly.

FIG. 1-FIG. 2 is a rear view of one such drum enhancement assembly 20 used with a bass drum 16. This example provided with a foot pedal assembly 18 attached to a support system 12 which in this example includes a floor stand resting on the floor or ground surface. An electronic bass drum 16 is then mounted to the support system 12 where the beater of the footplate will impact the batter head of the electronic bass drum 16 when the foot pedal 18 is operated. Sensors within the bass drum 16 convert the impact and any other vibration to electric signals as previously discussed.

When used without the drum enhancement assembly 20, the bass drum 16 is not visually pleasing, may be accidentally or incidentally struck by the user’s foot or other which would impart unwanted vibration to the sensors, and is also susceptible to vibration caused by sound waves generated by nearby instruments. The drum enhancement assembly 20 greatly increases the visual appeal as it appears more similar to a traditional drum with a shell 22, rim 24, and optional batter head 26. The shell 22 in one example comprising a rigid outer housing 28. The rigid outer housing 28 (shell 22, rim 24, and batter head 26) may be made of plastic, wood, metal, fiber reinforced plastic (FRP) such as fiberglass or carbon fiber, or a combination thereof.

The term rigid in this example meaning a structure that holds its shape under gravity and may hold it shape with moderate external pressure. Substantial forces may deform a rigid structure.

The shell 22 of several examples may also comprise a vibration dampening collar 30 interior of the outer housing 28 and configured to absorb vibration of the outer housing 28 and other structures and reduce transmission of these vibrations between the non-acoustic drum and exterior components, sensors, or persons. This vibration dampening collar 30 may be formed of a layer of open cell foam, closed cell foam, expanded plastic, natural or synthetic materials such as wool, felt, polyurethane foam, paper, etc. and combinations thereof. This vibration dampening collar 30 may be adhered to the inner surface 32 of the housing 28, cast/formed thereon, or may be fastened thereto with snaps, hook and loop closures, screws, or other structures. In other examples, the vibration dampening collar 30 may be press-fit into the housing 28 and held in place by compression/tension and friction.

Figure 8:
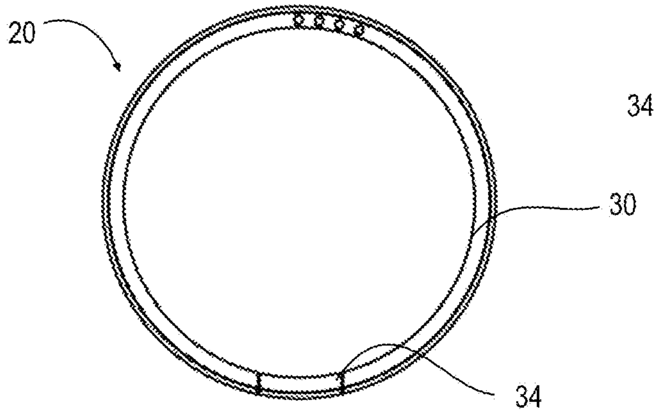
FIG. 8 is a front view of components of the example shown in FIG. 1.
Figure 9:
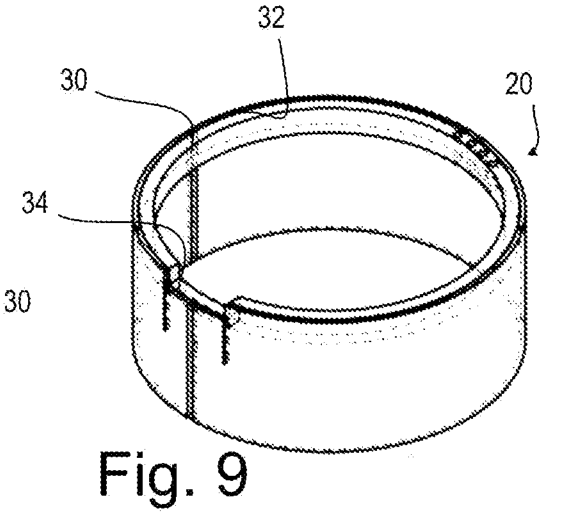
FIG. 9 is a perspective view of the example shown in FIG. 8.
Figure 10:
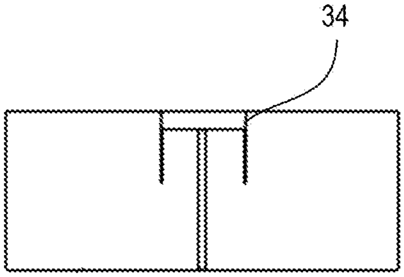
FIG. 10 is a bottom view of the example shown in FIG. 8.
Figure 11:
FIG. 11 is a side view of the example shown in FIG. 8.
Figure 12:
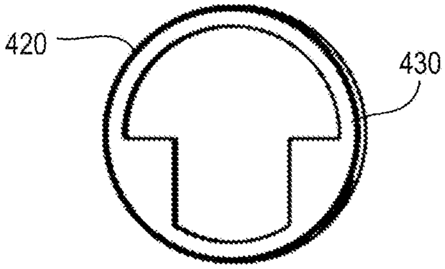
FIG. 12 is a top view of components of the example shown in FIG. 5.
Figure 13:
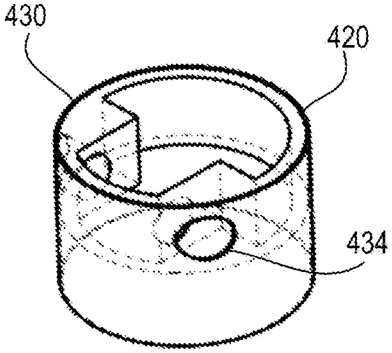
FIG. 13 is a perspective hidden line view of the example shown in FIG. 12.
Figure 14:
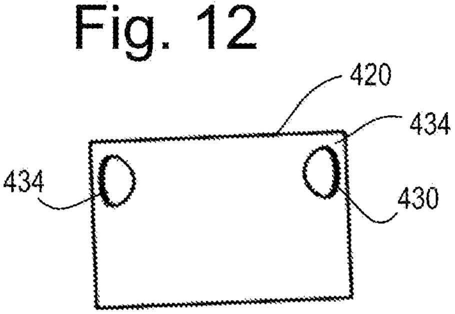
FIG. 14 is a front view of the example shown in FIG. 12.
Figure 15:
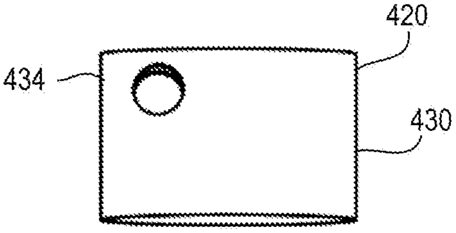
FIG. 15 is a side view of the example shown in FIG. 12.
Figure 16:
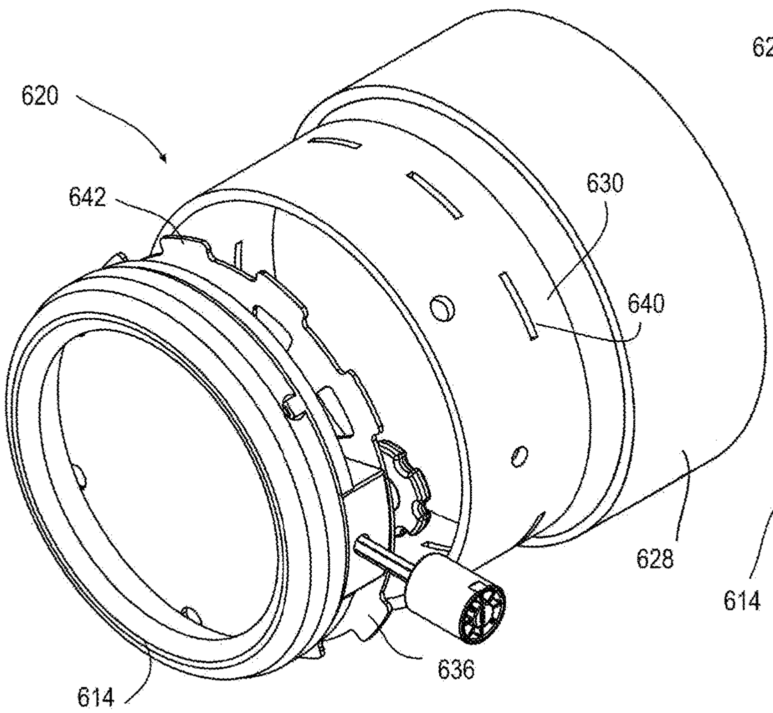
FIG. 16 is an isometric exploded view of one example of the disclosed drum enhancement assembly.

In one example a surface forming an opening 34 in the housing 28 is formed or cut for passage of a portion of the support system 12 through a portion of the housing 28. This opening surface 34 is more easily seen in FIG. 8 through FIG. 10. This opening 34 allows the non-acoustic drum to be positioned within the housing 28 to increase visual appeal and further reduce unwanted vibration and impact.

Figure 3:
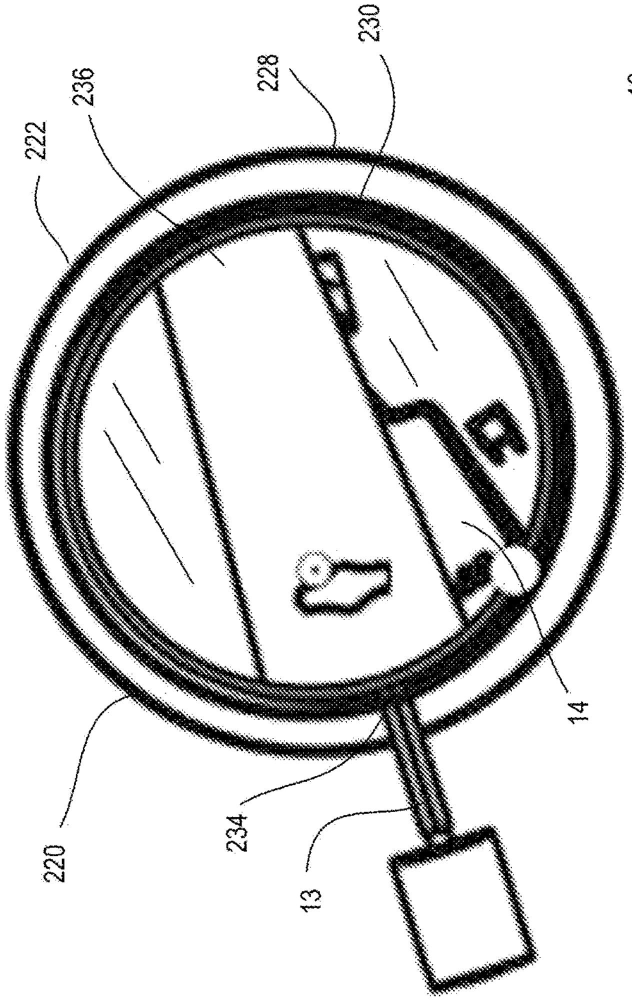
FIG. 3 is a top view of another example of the disclosed drum enhancement assembly.
Figure 4:
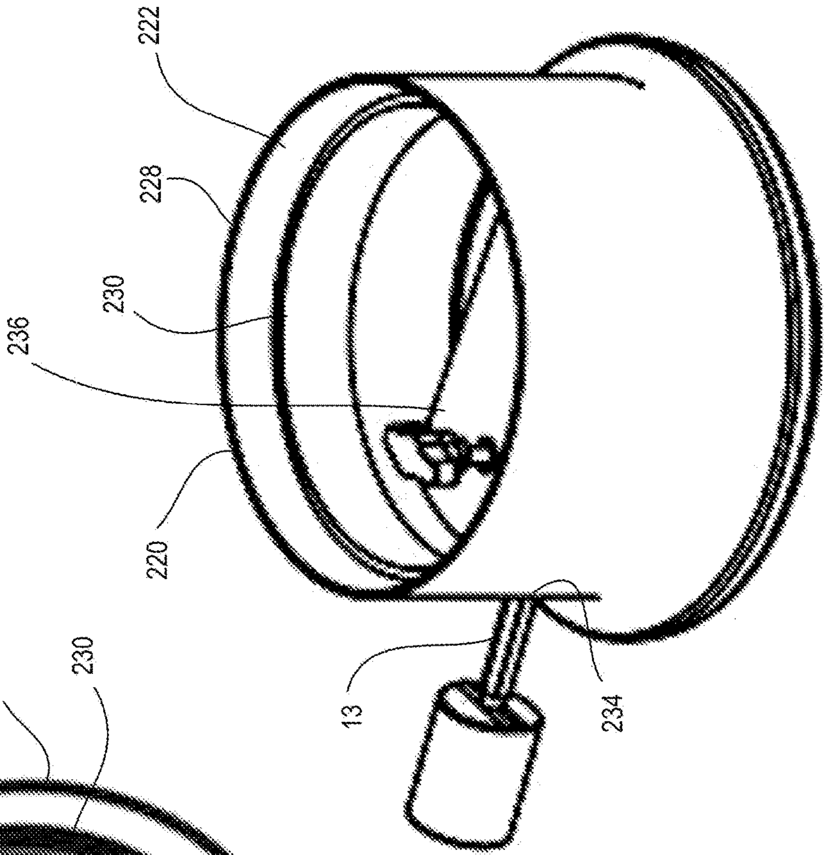
FIG. 4 is a perspective view of the example shown in FIG. 3.
Figure 6:
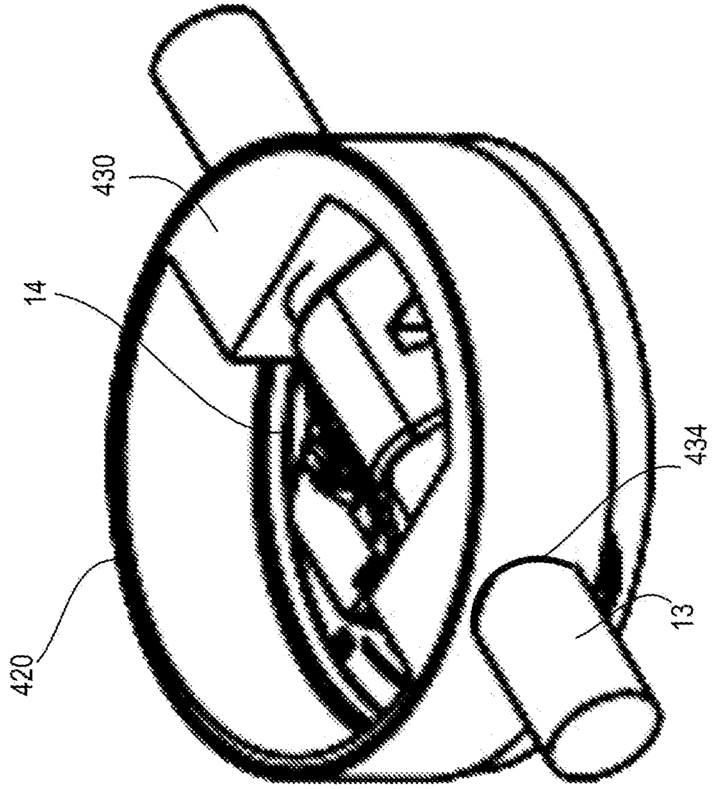
FIG. 6 is a perspective view of the example shown in FIG. 5.
Figure 5:
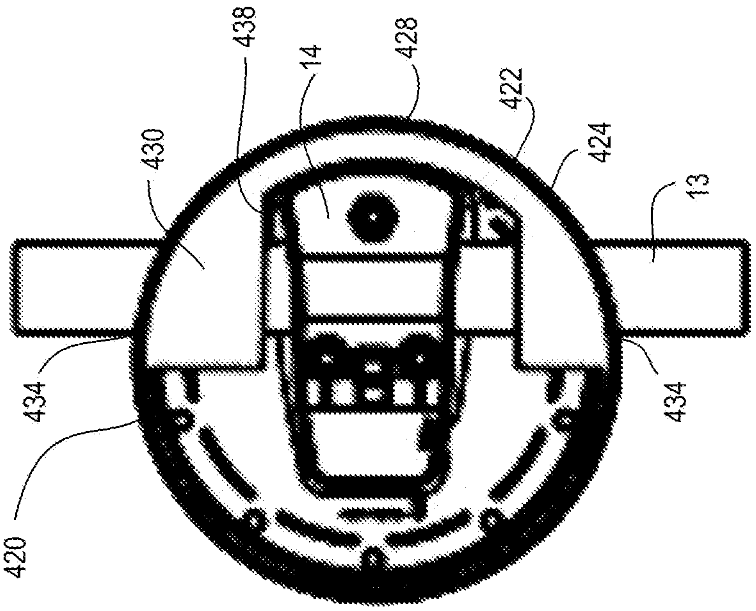
FIG. 5 is a top view of another example of the disclosed drum enhancement assembly.

Another mounting system is disclosed, particularly for the drums other than the bass drum 16. In FIGS. 3 and 4, is shown another example of the disclosed drum enhancement assembly and a different mounting assembly. To aid in understanding, components of this example which are similar in form and function to the previous example are labeled with a “2” prefix. For example, the drum enhancement assembly of the first example was labeled 20, and the drum enhancement assembly of the second example is labeled 220. This numbering system will continue in the description of other examples.

FIG. 3 and FIG. 4 show bottom views of this second example 220 with a non-acoustic drum 14 attached to the support system 12. In this example the non-acoustic drum 14 is mounted to a cross-arm 13 fitted within the housing 228 and collar 230. The non-acoustic drum 14 may be mounted to the cross-member 13 in a manner well known in the art such as screws, bayonet (quarter turn) mount, adhesives, hook and loop fastener, etc.

The rigid outer housing 228 (shell 222, rim 224) adds visual appeal, a rigid mounting structure, and other functions. This component may be made of plastic, wood, metal, or a combination thereof as well as other materials. The shell 222 may also comprise a vibration dampening collar 230 interior of the outer housing 228. The vibration dampening collar 230 configured to absorb vibration from the outer housing 228 and from other structures as well as to reduce transmission of these vibrations to the non-acoustic drum 14 as previously described. In this example, the cross-member 13 passes through a surface defining an opening 234 in the housing 228.

The outer housing 228 of this example may be attached to the non-acoustic electronic drum 14 by way of compression fit, hook and loop fasteners, screws, set screws, or equivalents. Similarly, the housing 228 may be mounted to the support system 12 by fasteners, adhesives, hook and loop assemblies, or equivalents. Thus, the non-acoustic drum 14, the vibration dampening collar 230, and the housing 228 are each connected to the support system 12. For example, a spar 236 may be affixed to the housing 228, and the spar 236 affixed to the support system 12. In one example, the non-acoustic drum 14 is then mounted to the spar 236 for ease in assembly.

FIGS. 5, 6, and 12-15 show a third example drum enhancement assembly 420 with a non-acoustic drum 14. This example shows the non-acoustic drum 14 and the vibration dampening collar 430 attached to the support system 12 by way of a cross-arm 13 which may be a component of the support system 12 previously discussed. In one example, the cross-arm 13 may pass through opposing sides of the outer housing 428 for various uses and support. The non-acoustic drum 14 may be mounted to the cross-member 13 in a manner well known in the art including friction fit, a tensioning clamp, adhesives, fasteners, hook and loop materials, etc.

As with previous examples, the rigid outer housing 428 (shell 422, rim 424) may be made of plastic, wood, metal, or a combination thereof. The shell 422 may also comprise a vibration dampening collar 430 interior of the outer housing 428 and configured to absorb vibration of the outer housing 428 and other structures and reduce transmission of these vibrations to the non-acoustic drum 14. In this example, the cross-member 13 passes through a plurality of surfaces defining openings 434 in the housing 428.

As with the previous examples, the housing 428 may be attached to the non-acoustic drum 14 by way of the vibration dampening collar 430 being compression fit or hook and loop or equivalents onto the non-acoustic drum 14. In another example the housing 428 is mounted to the support system 12 by fasteners, adhesives, hook and loop assemblies, or equivalents.

In this example, the vibration dampening collar 430 has a non-cylindrical inner surface 438 to conform to the adjacent outer surface of the non-acoustic drum 14. In such examples, a user may cut or otherwise form the vibration dampening collar 430 to the exterior surface of a specific non-acoustic drum 14. With some common non-acoustic drums 14, a manufacturer of the disclosed assembly 420 may provide pre-formed vibration dampening collar 430 with a non-cylindrical inner surface 438 to conform to common or popular non-acoustic drums 14.

Another example is disclosed for ease in manufacturing, shipping, and installation. This Example is shown in FIG. 16-19. In this example, both the vibration dampening collar 630 and the spokeframe 636 are formed as flat components. The vibration dampening collar 630 is formed as a flat component with a plurality of openings or grooves 640 which correspond to spokes 642 on a spokeframe 636 corresponding to the spars 236, 436 previously described. The spokes are inserted into the grooves 640 during assembly and hold the spokeframe 636 in position on the collar 630. The assembled vibration dampening collar 630 and spokeframe 636 and attached drum 614 may additionally be positioned within a housing 628 as previously described relative to the other examples. The housing 628 may also be a flexible component, formed from a flat sheet of polymer, plastic, paper, metal or combinations thereof formed to a final shape such as a cylinder as shown and then secured in place.

In one example, the housing 628 is affixed to the dampening collar 630 prior to forming a final shape, such as a cylinder. This fixing may be accomplished by adhesives, hook and loop fasteners, forming in place, etc.

In this example, each of the spokeframe 636 and the dampening collar 630 may be substantially flat prior to assembly, reducing shipping costs and storage volume. This vibration dampening collar 630 may be formed of a layer of open cell foam, closed cell foam, expanded plastic, natural or synthetic materials such as wool, felt, polyurethane foam, paper, etc. and combinations thereof.

The spokeframe 636 may be formed of plastic, wood, metal, fiber reinforced plastic (FRP) such as fiberglass or carbon fiber, or a combination thereof.

The drum 614 may be attached to the spokeframe 636 in different ways, including one or more fasteners 644 passing through surfaces defining voids 646 in the spokeframe and engaging a pre-formed female threaded void in the drum 614 or otherwise attached thereto. As shown, the fastener 644 is a knurled knob which allows for attachment without additional tools, the knurled knob configured to be rotated by hand.

Figure 20:
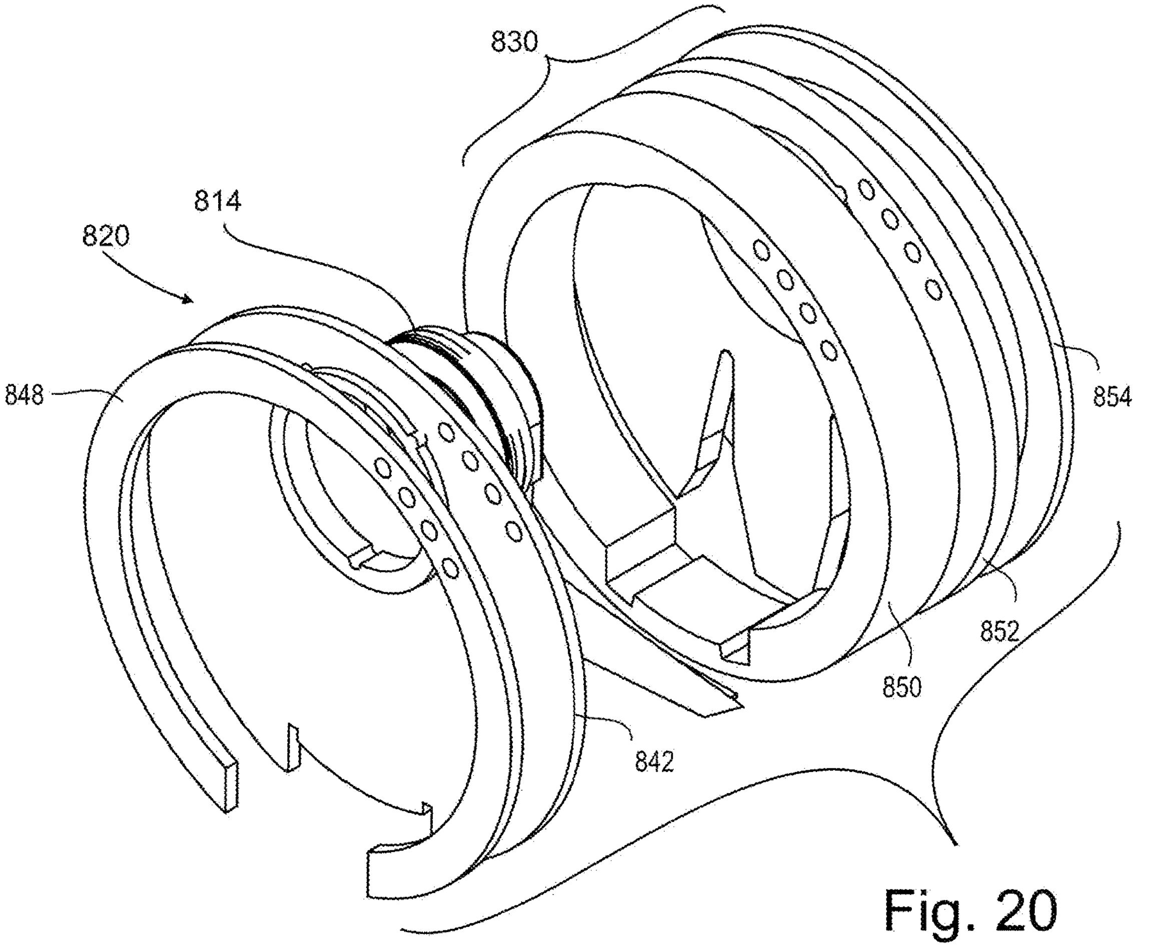
FIG. 20 is an isometric exploded view of one example of the disclosed drum enhancement assembly.
Figure 21:
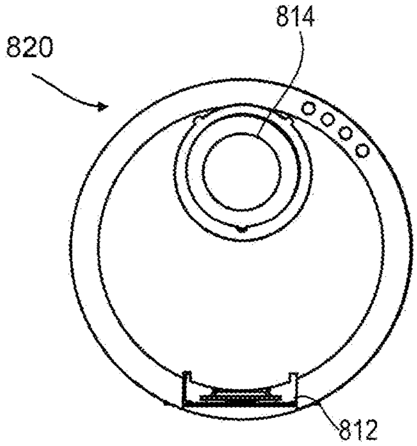
FIG. 21 is a front view of the example shown in FIG. 20.
Figure 22:
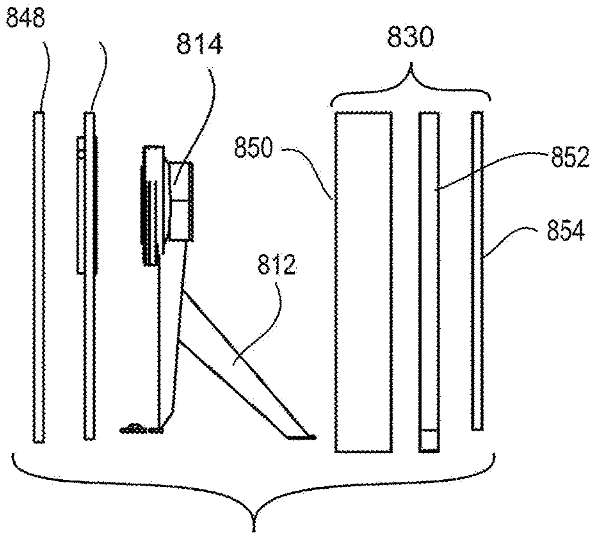
FIG. 22 is an exploded side view of the example shown in FIG. 20.

A similar structure to the previous example is shown in FIG. 20-21 used with a bass drum 814. In this example, the vibration dampening collar 830 may be provided in sections, including a dampening forward ring 848 fitted forward of a support plate 842, a dampening mid collar 850, a rear dampening plate 852, and a rear dampening collar 854. The support plate 842, dampening mid collar 850, rear dampening plate 852, and rear dampening collar 854 may be attached in groups by way of fasteners, adhesives, or formed as a unitary structure. As shown, each of the dampening forward ring 848, dampening mid collar 850, a rear dampening plate 852, and a rear dampening collar 854 may be formed of open cell foam or other sound and vibration dampening material. Each of these components having surfaces configured for the passage of the support system 812. While the dampening forward ring 848, dampening mid collar 850, and rear dampening collar 854 are generally cylindrical with an open central region allowing for space for the bass drum 814, the rear dampening plate 852 may be substantially solid for maximum dampening. With surfaces forming openings for the bass drum 814, power and/or data cords, and/or the support system 812.

As with previous examples, the assembled drum enhancement assembly may additionally be positioned within a housing as previously described relative to the other examples. The housing may also be a flexible component, formed from a flat sheet of polymer, plastic, paper, metal or combinations thereof formed to a final shape such as a cylinder as shown and then secured in place.

Figure 23:
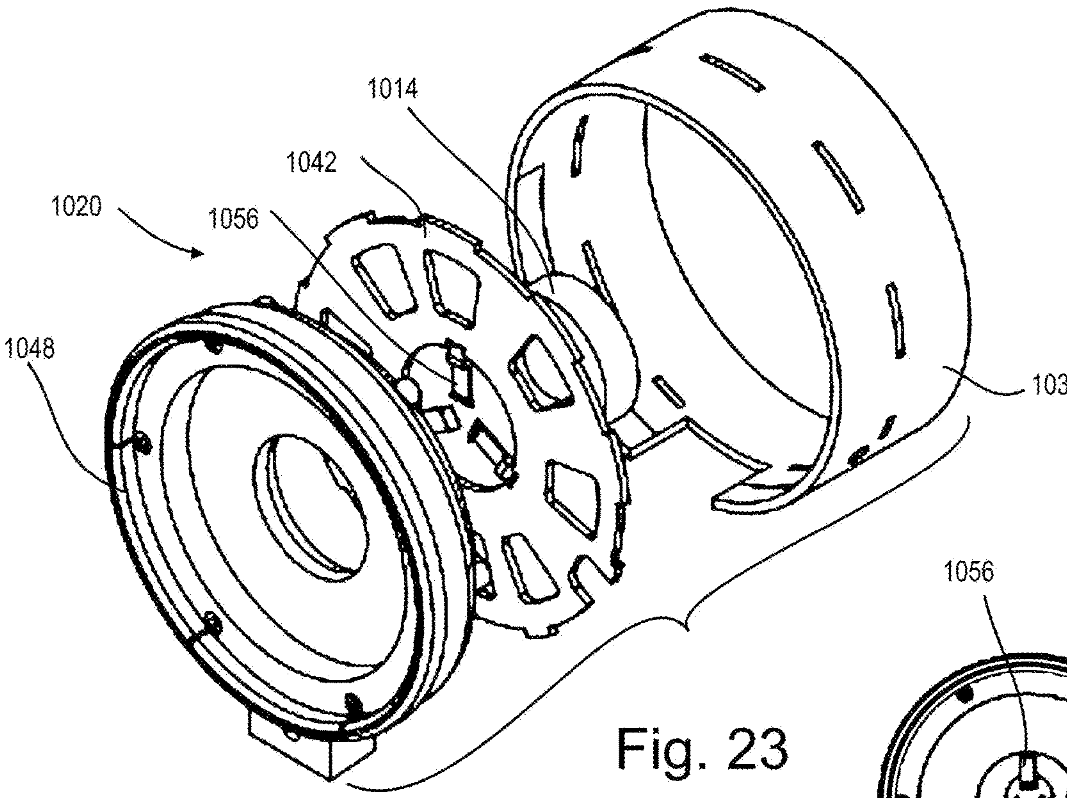
FIG. 23 is an isometric exploded view of one example of the disclosed drum enhancement assembly.
Figure 24:
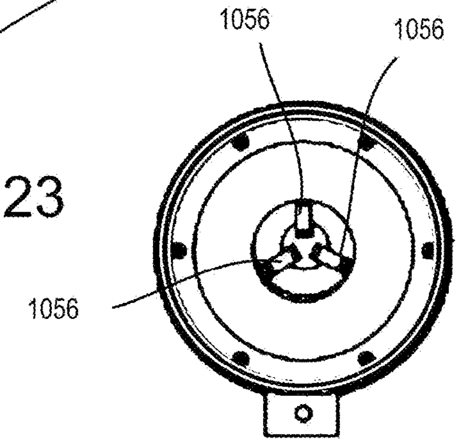
FIG. 24 is a front view of the example shown in FIG. 23.

Another example 1020 is shown in FIG. 23, FIG. 24 with a spokeframe 1042 having a plurality of radial fingers 1056 extending radially inward from a central opening. These radial fingers 1056 are configured to engage and hold the drum 1014 to the spokeframe 1042. A forward dampening collar 1048 and dampening collar 1030 are positioned on either side of the spokeframe 1042.

As with previous examples, the assembled drum enhancement assembly may additionally be positioned within a housing as previously described relative to the other examples. The housing may also be a flexible component, formed from a flat sheet of polymer, plastic, paper, metal or combinations thereof formed to a final shape such as a cylinder as shown and then secured in place.

Figure 25:
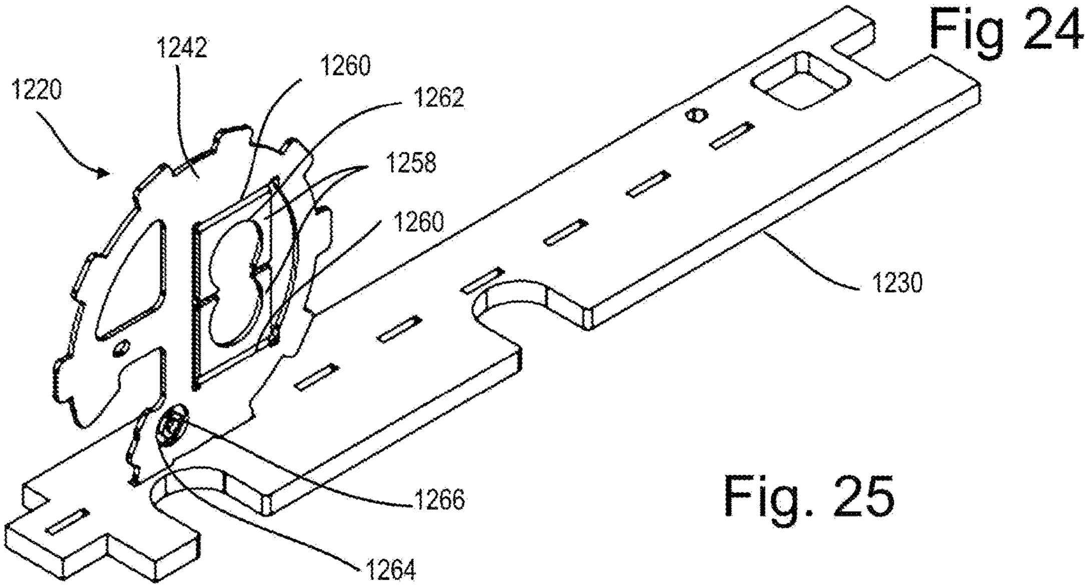
FIG. 25 is an isometric exploded view of one example of the disclosed drum enhancement assembly.

Another example is disclosed in FIG. 25. In this example 1220, the spokeframe 1242 engages the dampening collar 1230 as shown in previous examples. In this example, the spokeframe 1242 comprises one or more hinged receivers 1258. These hinged receivers 1258 are connected to the spokeframe 1242 by way of a hinge 1260 or pivot. In the example shown, the hinge(s) 1260 may be living hinges. Each of the hinged receivers configured to engage or allow passage of portions of the speaker attached to the spokeframe 1242.

Figure 17:
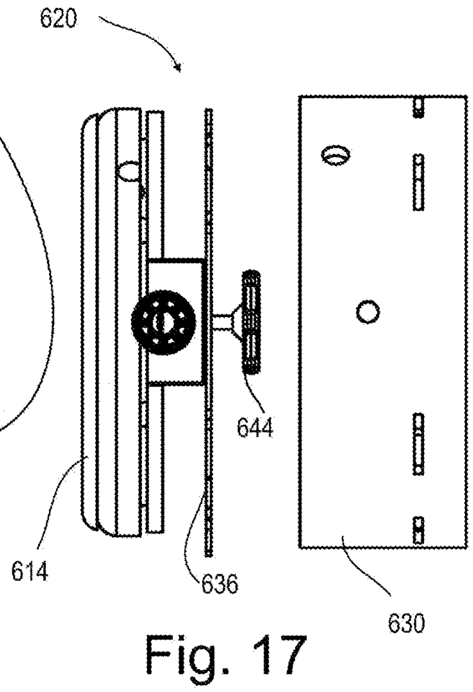
FIG. 17 is a side view of the example shown in FIG. 16.
Figure 18:
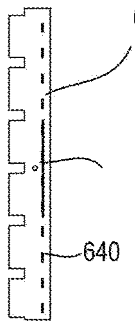
FIG. 18 is a plan view of one component of the example shown in FIG. 16.
Figure 19:
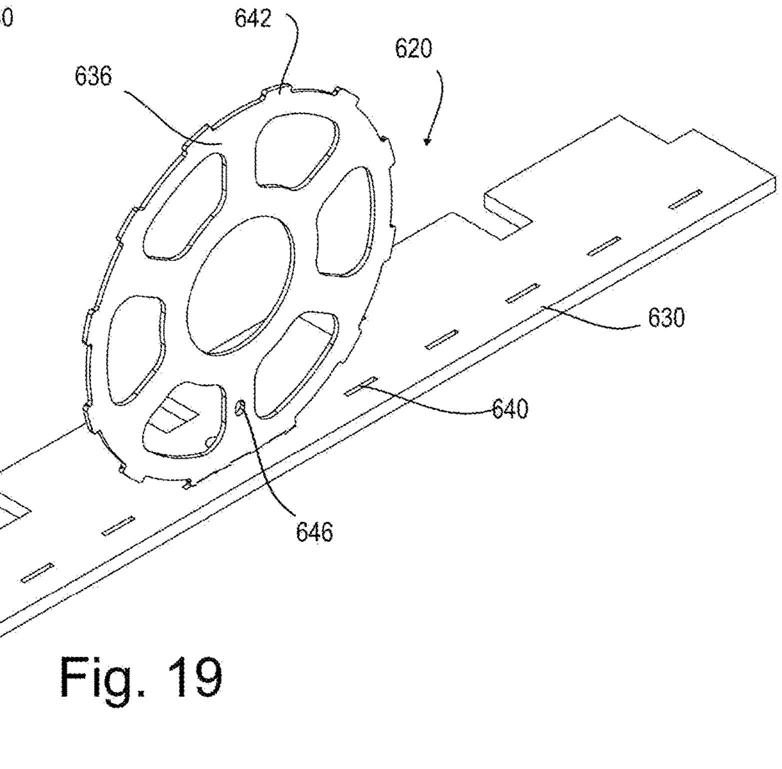
FIG. 19 is an isometric view of several components shown in FIG. 16.

This example also utilizes a surface defining a void 1264 for passage of a fastener such as the fastener 644 shown in FIG. 17 to attach the speaker to the spokeframe 1242. In this example, the surface defining a void 1264 is attached to the spokeframe 1242 by way of a plurality of standoffs 1266. This provides additional vibration dampening between the speaker and the spokeframe 1242. In addition, these standoffs 1266 may be broken if needed to enlarge the surface defining the void 1264.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept. The invention illustratively disclosed herein suitably may be practiced in the absence of any element which is not specifically disclosed herein.

The invention claimed is:

1. A drum enhancement assembly comprising:

a rigid outer housing circumferentially surrounding the perimeter of an electronic non-acoustic drum;

the electronic non-acoustic drum comprising a batter head and sensors configured to convert impact force or movement of the batter head into electric signals;

a vibration dampening collar attached to an inner circumferential surface of the rigid outer housing; and the vibration dampening collar radially positioned between the electronic non-acoustic drum and the rigid outer housing.

2. The drum enhancement assembly as recited in claim 1 wherein an outer surface of the vibration dampening collar is adhered to an inner surface of the rigid outer housing.

3. The drum enhancement assembly as recited in claim 1 wherein an inner surface of the vibration dampening collar is in contact with an outer surface of the electronic non-acoustic drum.

4. The drum enhancement assembly as recited in claim 1 further comprising a non-acoustic drum attached to the rigid outer housing.

5. A drum enhancement assembly comprising:

a rigid outer housing surrounding the perimeter of an electronic non- acoustic drum;

a vibration dampening collar attached to an inner surface of the rigid outer housing;

the vibration dampening collar positioned between the electronic non- acoustic drum and the rigid outer housing;

surfaces defining an opening through the rigid outer housing configured for passage of a drum positioning system to which the electronic non-acoustic drum is affixed; and a spokeframe attached to the vibration dampening collar, the electronic non-acoustic drum removably attached to the spokeframe.

* * * * *